(12) United States Patent
Sheppard et al.

(10) Patent No.: US 10,988,947 B2
(45) Date of Patent: Apr. 27, 2021

(54) DECK CONSTRUCTION DEVICE

(71) Applicant: The Decking Tool Ltd, Southampton (GB)

(72) Inventors: Stuart Sheppard, Eastleigh (GB); Carl Maskelyne, Eastleigh (GB)

(73) Assignee: The Decking Tool Ltd, Southampton (GB)

( * ) Notice: Subject to any disclaimer, the term of this patent is extended or adjusted under 35 U.S.C. 154(b) by 0 days.

(21) Appl. No.: 16/489,655

(22) PCT Filed: Feb. 28, 2018

(86) PCT No.: PCT/EP2018/054915
§ 371 (c)(1),
(2) Date: Aug. 28, 2019

(87) PCT Pub. No.: WO2018/158307
PCT Pub. Date: Sep. 7, 2018

(65) Prior Publication Data
US 2020/0011073 A1   Jan. 9, 2020

(30) Foreign Application Priority Data
Feb. 28, 2017 (GB) .................................. 1703208

(51) Int. Cl.
*E04G 21/00* (2006.01)
*E04G 21/18* (2006.01)
*B25B 23/00* (2006.01)
*E04F 21/20* (2006.01)
*G01B 3/02* (2020.01)
(Continued)

(52) U.S. Cl.
CPC ........ *E04G 21/1883* (2013.01); *B25B 23/005* (2013.01); *E04F 21/0092* (2013.01); *E04F 21/20* (2013.01); *G01B 3/02* (2013.01); *G01C 9/34* (2013.01)

(58) Field of Classification Search
CPC .............. E04F 21/0092; E04F 21/1883; E04F 21/1841; G01B 3/30
USPC .................................. 33/526, 527; 52/749.1
See application file for complete search history.

(56) References Cited

U.S. PATENT DOCUMENTS 4,930,225 A    6/1990  Phillips
6,243,961 B1 *  6/2001  Winski .................... B25H 7/00
                                                     33/474

(Continued)

FOREIGN PATENT DOCUMENTS

EP    2850262       3/2015
WO    WO2005/047620  5/2005
WO    WO2013/173420  11/2013

OTHER PUBLICATIONS

GB 1703208.7 Examination Report, dated Aug. 1, 2019.
(Continued)

*Primary Examiner* — Christopher W Fulton

(57) ABSTRACT

A deck construction device for assisting with laying decking. The device as a body which has a handle and a substantially planar face from which at least two spacers extend. At least one screw hole is defined through the body, the at least two spacers are arranged to span a width of a decking plank. The length of a first spacer corresponds to the thickness of a decking plank; and the length of a second spacer extends beyond the thickness of the decking.

17 Claims, 13 Drawing Sheets

(51) Int. Cl.
    *G01C 9/34*    (2006.01)
    *E04F 21/00*   (2006.01)

(56) References Cited

U.S. PATENT DOCUMENTS

| | | | | |
|---|---|---|---|---|
| 6,622,394 B2* | 9/2003 | Werner | ................ | B25H 7/02 33/474 |
| 8,307,564 B1* | 11/2012 | Heaton | ................ | G01B 3/566 33/527 |
| 8,789,809 B2* | 7/2014 | Lehmann | ................ | E04F 21/22 254/17 |
| 8,793,889 B2* | 8/2014 | Hovren | ................ | B25B 23/08 33/527 |
| 8,881,419 B2* | 11/2014 | Madrack | ................ | E04F 21/0092 33/526 |
| 2002/0083610 A1* | 7/2002 | Camara | ................ | E04B 5/12 33/645 |
| 2007/0175176 A1 | 8/2007 | Lane | | |
| 2008/0022629 A1* | 1/2008 | Behnecke | ................ | E04F 21/1883 52/750 |
| 2008/0053036 A1* | 3/2008 | Graham | ................ | E04F 21/185 52/749.1 |
| 2010/0083610 A1 | 4/2010 | King | | |
| 2010/0095540 A1* | 4/2010 | Berkman | ................ | G01C 15/00 33/286 |
| 2011/0214389 A1* | 9/2011 | Paton | ................ | E04G 21/16 52/749.1 |
| 2015/0152657 A1* | 6/2015 | Reed | ................ | E04G 21/1891 33/526 |
| 2015/0197945 A1* | 7/2015 | Hamilton | ................ | E04F 21/0092 33/526 |
| 2016/0018206 A1 | 1/2016 | Hollis et al. | | |

OTHER PUBLICATIONS

GB 1703208.7 Combined Search and Examination Report, dated Aug. 1, 2017.
PCT/EP2018/054915 International Search Report and Written Opinion, dated Apr. 20, 2018.

\* cited by examiner

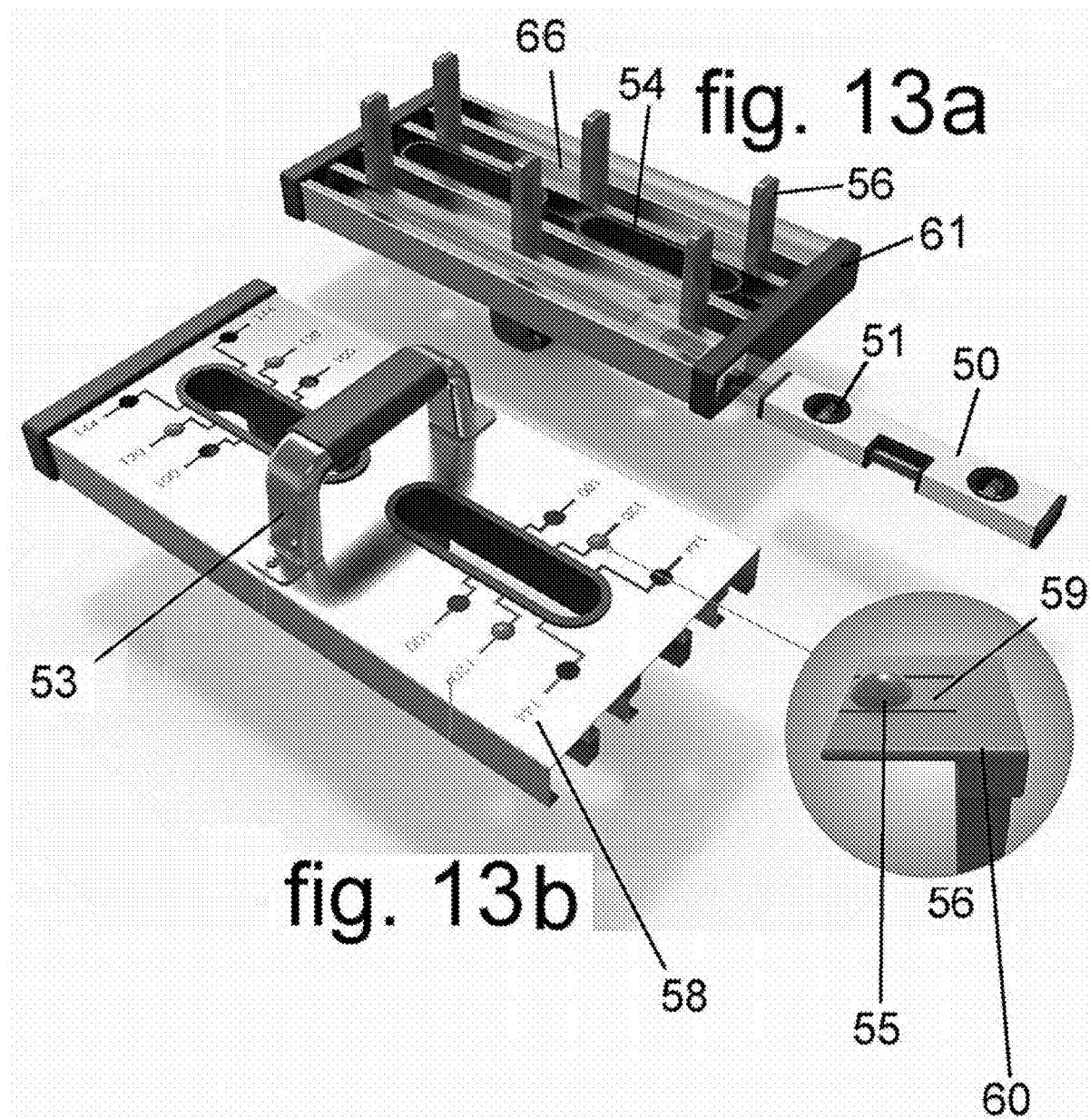

DECK CONSTRUCTION DEVICE

FIELD OF THE INVENTION

The present invention relates to a deck construction device, in particular a device for aiding in construction of decking; more particularly but not exclusively a spacer device for spacing between decking planks.

BACKGROUND

Increasing proliferation of wooden decking as an outdoor feature is common across many societies.

Construction of decking involves placing substantially horizontal elongate planks of decking material in a parallel arrangement on hangers that are supported by substantially vertical joists, all to be spaced apart in regular spacings.

It can be imprecise and problematic to arrange decking planks with regular spacings. Likewise identifying where subordinate joists are can also be equally problematic, leading to lost time, and/or misplaced screws and/or wonky planks.

PRIOR ART

EP 2 850 262 (BELINDA et al) discloses a fastener storage assembly.

US 2014 0 223 755 (MADRACK) discloses a deck plank spacer and fastener guide tool with a lightweight, unitary body.

US 2010 0 050 454 (MCHOWELL) discloses a device comprising: a center deck, the center deck being substantially planar; a first pair of spacing surfaces, the first pair of spacing surfaces being substantially planar and substantially parallel surfaces that extend from a bottom side of the center deck at a right angle thereto.

WO2013/173420 (BELINDA) discloses a container and lid with fastener alignment guide.

US2010/0083610 (KING) discloses an installation pilot device.

US2007/0175176 (LANE) discloses a decking board installation device.

The present invention arose in order to overcome problems suffered by existing devices.

SUMMARY OF THE INVENTION

According to the present invention there is provided deck construction device comprising: a body which has a handle and a substantially planar face from which at least two spacers extend, at least one screw hole is defined through the body, the at least two spacers are arranged to span a width of a decking plank; the length of a first spacer corresponds to the thickness of a decking plank; and the length of a second spacer extends beyond the thickness of the decking plank.

The spacers are sized and dimensioned to be inserted between two adjacent planks of decking so as to correctly space apart planks of decking.

In this way the device is arranged over decking such that a pair of spacers pass either side of a width of decking in order to define the correct distance by which adjacent lengths of decking are arranged. The device therefore enables decking to be accurately laid with even spacing across an area.

The at least two spacers can be arranged so that when in use each spacer is located either side of a decking plank against which the device rests; the location, orientation and width of the at least two spacers being so as to space a first adjacent decking plank, located on one side of the decking plank, and a second adjacent decking plank, located on an opposed side of the decking plank, thereby spacing the decking planks apart one from another. This enables decking to be quickly and accurately laid.

Preferably the body is dimensioned to span at least two planks of decking having at least one row of three spacers.

The spacers are of different lengths so as to permit a joist to pass under a short spacer and to allow a longer spacer to abut a longer spacer. In this way the device can be positioned over a joist and/or adjacent a wall whilst still permitting accurate measurement of deck plank spacing.

The spacers preferably have substantially rectangular shaped sections. In this way the spacers may be envisaged to slot between elongate lengths of decking planks, so as to space such planks apart.

Preferably the spacers have tapered sectional depth being narrowest at the tip of the spacer. In this way as the spacers are inserted the planks are gradually adjusted and aligned to the correct spacing.

In a preferred embodiment the spacers are arranged in sets comprising at least two spacers which rest against one side of the decking plank.

In this way two or more spacers may be arranged against the same side of a decking plank or within the same channel defined between two decking planks. The sets are spaced longitudinally apart so that in use these sets are thereby spaced along the lengths of decking planks.

The body of the deck construction is a substantially planar form, with the spacers extending substantially orthogonally therefrom, which in use is typically defined as depending vertically.

In some embodiments the body may comprise an elongate form in plan, wherein spacer sets are arranged adjacent the ends and intermediate the end sets. The sets of spacers may be envisaged to be spaced at equal distances.

The body has at least one screw hole for guiding position of a screw to secure decking.

The screw hole may include markers to guide screw location.

Ideally the body may comprise plural screw holes and preferably the at least two screw holes are arranged in an elongate track, running part or all of the length of the body.

The screw holes are preferably arranged in relation to the spacers, so as to enable a user to screw through the body and secure the decking planks to subordinate support joists, being spaced apart at optimal distances.

In a preferred embodiment a screw hole has a guideline associated with it so that the point what which the guideline reaches the edge of the device can also be used to mark where a screw can be located a predetermined distance from the screw hole provided through the body.

Advantageously this permits even spacing of screws along a plank of decking.

Preferably an edge of the device includes a measure so as to serve as a ruler.

In some embodiments the screw holes, apertures or opening, may be used as, or provided as a visual aid. For example in some embodiments a screw hole, aperture or opening may be arranged to allow visibility of the subordinate decking in use.

In some embodiments a central perforation may be utilisable as a guide for drilling, for example wherein the perforation may comprise a number of spaced guide markings.

In another embodiment apertures may be provided for receipt of removable spacers. In such way the spacers may be inserted at selected locations along the body as required, so as to adjust mutual spacings. For example to accommodate different types of decking plank. The apertures may be arranged in elongate tracks, running part or all of the length of the body.

Preferably the device is formed as a single part. The device may be formed from a layer of synthetic plastics. For example the device may be formed from a thermoplastic such as acrylonitrile butadiene styrene (abs) or polyethylene. In other embodiments the device may formed in metal or alloy.

Ideally the device is shaped so as to be stackable.

In some embodiments the device comprises a levelling mechanism so as to ensure that the decking is being laid level.

The levelling mechanism may comprise at least one liquid or spirit level, which level is arranged to provide an indication of level of the subordinate decking.

Preferably the two levels are arranged so that their axes are orthogonal one to another. Some embodiments may have levels adjacent or at the ends of the body, so as to enable levels to be checked at either end of the device.

In some embodiments the body includes a recess for removably receiving the level. In this way a level can be added to and removed from the device. For example a level may be snap fitted into place.

The device has at least one handle. Such handle is ideally robust and is arranged to enable a user to lift the device vertically from the decking to move the device to another section of the deck, or another section of decking planks.

Preferably a central opening is arranged below the handle to permit stacking of devices atop one another.

In some embodiments at least one of the spacers is adjustable so as to vary its angle of orientation. For example the spacer may be rotatable in the body.

In this way the device may be used to help set planks at selected angles of orientation. For example planks could be arranged at a 30 or 45 degree angle to subordinate fixings such as joists.

Screw holes and spacers may be arranged relative to the body at an angle, wherein the body may define a first axis and the screw holes and spacers may be arranged along second axes at 30 or 45 degrees to the first axis.

For example the spacers may be rotatable, such that the spacers may be individually rotated to define further axes. In some embodiments the body may comprise markings to define axes or plank angles with reference to the perforations, which perforations are envisaged for use with the subordinate joists.

In some embodiments with rotatable spacers, at least one of the spacers may have intermediate positions with resilient stoppers, so as to aid in precise angling.

A preferred embodiment of the invention will now be described by way of example only and with reference to the Figures in which:

BRIEF DESCRIPTION OF FIGURES

FIGS. 13a and 13b show exploded isometric views of the embodiment shown in FIG. 12.

DETAILED DESCRIPTION OF FIGURES

Figure 1:
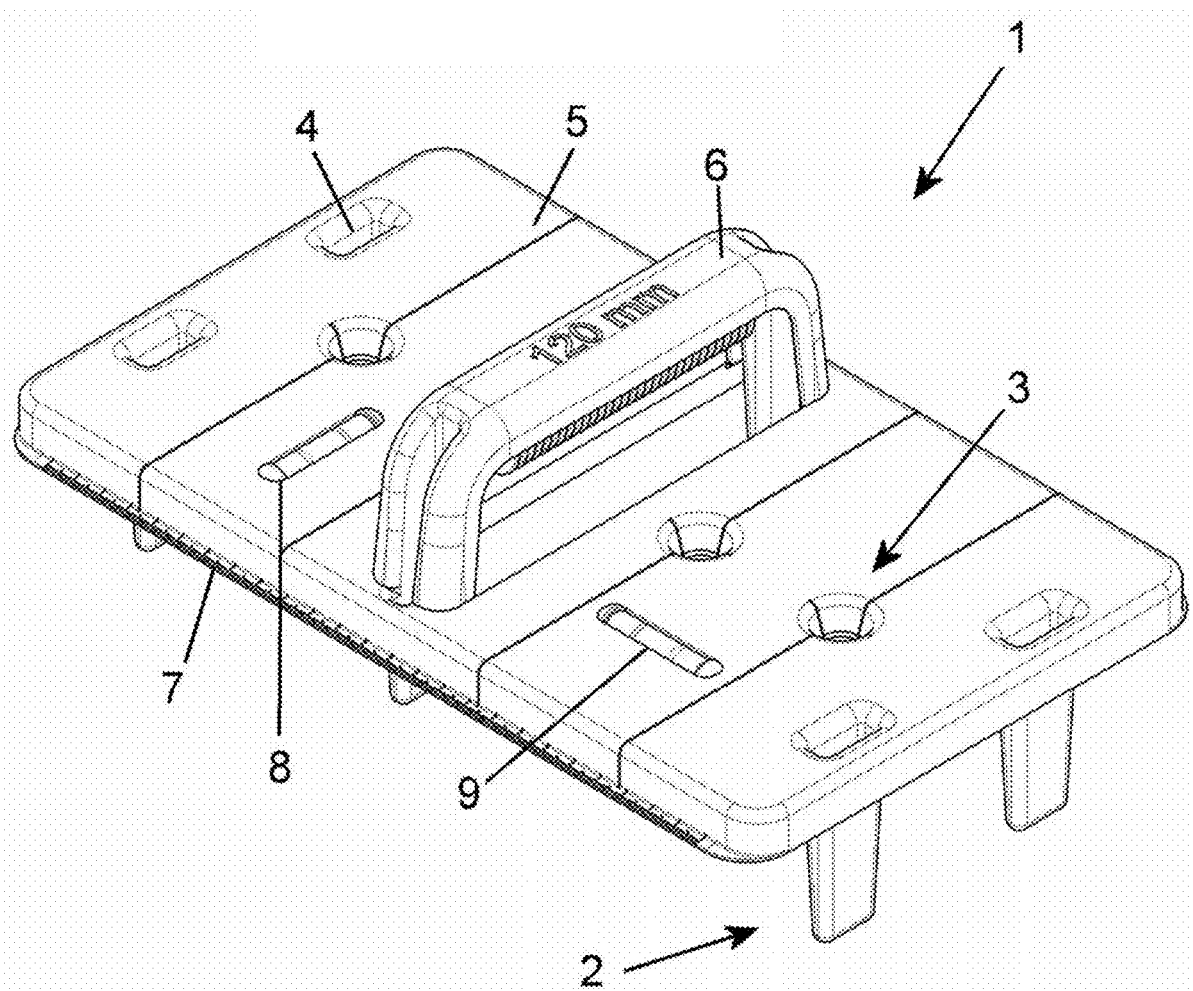
FIG. 1 shows an isometric view of a first embodiment of the device according to the present invention.

With reference to FIGS. 1 to 7 there is shown a first embodiment of the deck construction device 1 comprising a body 5 with six spacers.

First spacers 12 extend to a depth equal to the thickness of the decking plank. Second spacers 2 extend to a depth beyond the decking plank.

There are two of the shorter spacers 12 arranged below the handle 6 and four longer spacers 2 arranged at ends of the body.

The first and second spacers 2, 12 are spaced apart on the body 5 so as to define a decking plank width.

The body 5 is substantially rectangular, with two sides, and two ends, and a substantially planar side profile formed by an inverted tray shape, with an extending handle 6.

The body 5 is arranged substantially horizontally in use, with the spacers 2, 12 extending downwards substantially vertically in use so as to slot between decking planks or between a surface such as a wall and a decking plank.

The spacers 2, 12 are arranged in sets of two, having two second spacers 2 arranged at each end of the body and a set of two of the first spacers 12 arranged at a mid point between the ends of the body.

Each set of spacers is spaced apart in a parallel arrangement.

The shorter spacers 12 extend below the body 5 in continuation of a handle 6 extending above the body 5. The handle 6 defines an opening 17 in the body below the handle 6. This permits stacking of devices one device atop another. The spacers are also shaped to be hollow to permit stacking.

The handle 6 also has a grip surface 16 extending below it to its underside. The grip surface comprises plural parallel ribs in the pictured embodiment but may comprise resiliently deformable material or coating in further embodiments.

The spacers are hollow so as to permit stacking and define a recess 4 on an upper surface of the body. The recess may be used to store items such as screws.

The device comprises four screw holes 3, arranged in a line having a pair of screw holes 3 either side of the handle 6. The screw holes 3 are set centrally between the two side edges of the body. The screw holes 3 have chamfered sides to easier enable correct guided insertion and passage of screws in use.

The chamfered edges include marker lines that guide screw location.

The body 5 further includes two liquid bubble levels 8, 9 to ensure subordinate decking is being laid level.

The device further comprises measurement means 7, comprising a measuring rule arranged along either side of the body.

The levels 8,9 are arranged to either side of the handle 6 wherein one level 9 is arranged parallel one set of screw hole perforations 3, and another level 8 is orthogonal the other screw hole perforation set, and parallel the body's end.

The device predominantly comprises a unitarily moulded thermoplastics body 5, with two indentations for receipt of the levels.

Figure 2:
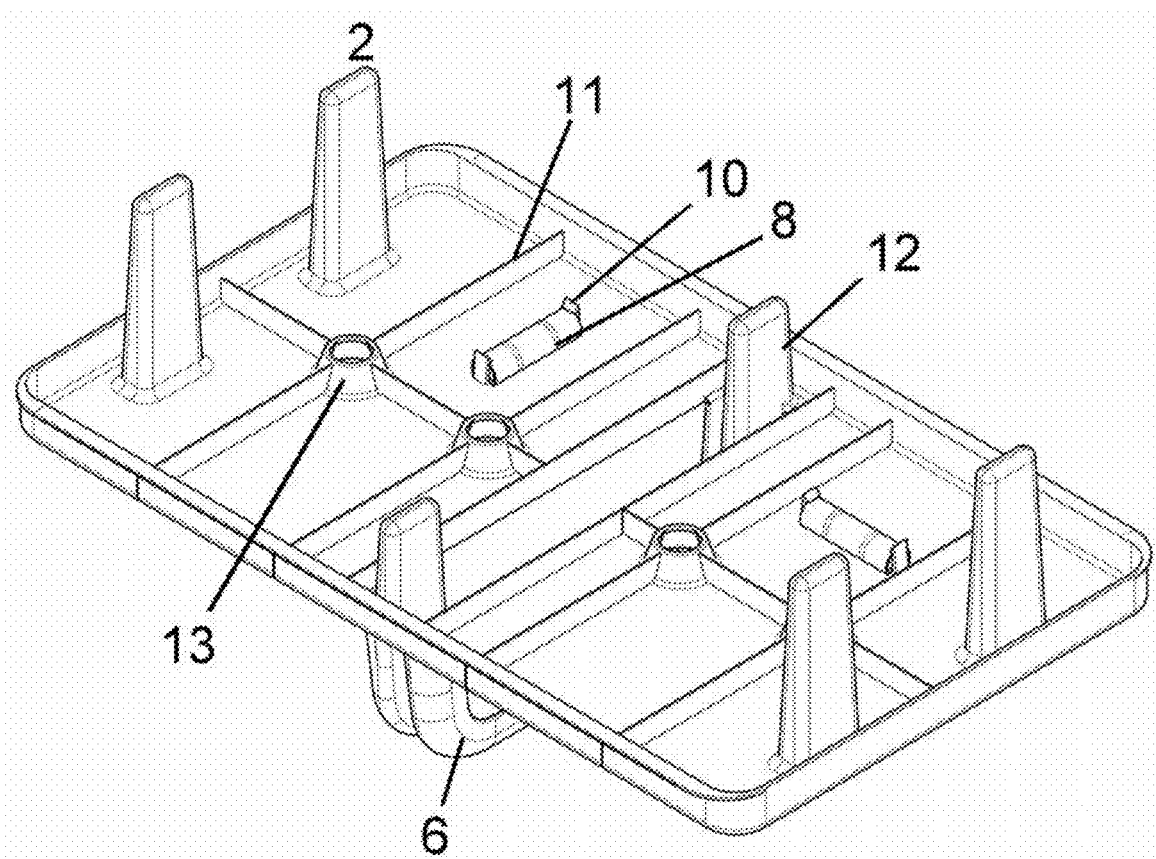
FIG. 2 shows a reverse isometric view of the embodiment shown in FIG. 1.
Figure 3:
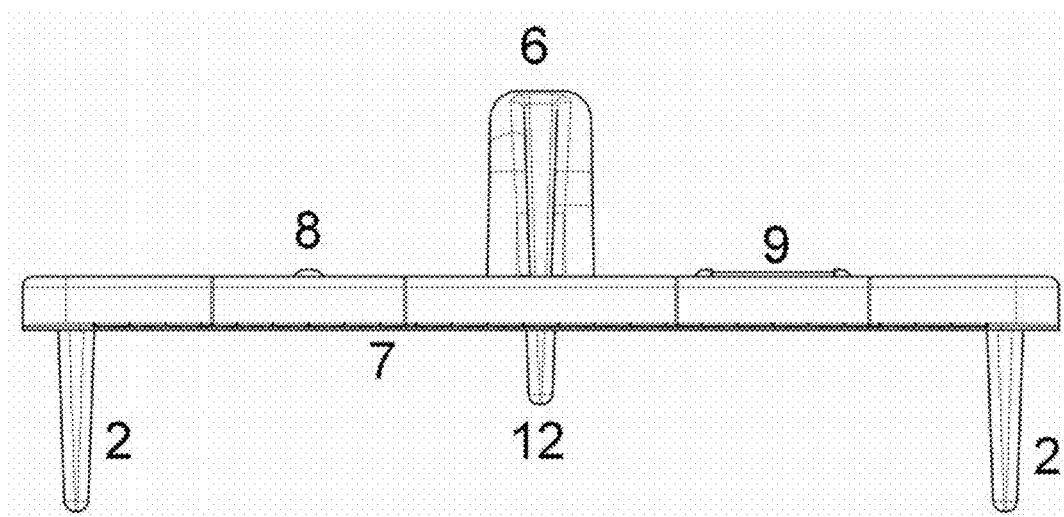
FIG. 3 shows a side view of the embodiment of the device shown in FIG. 1.
Figure 4:
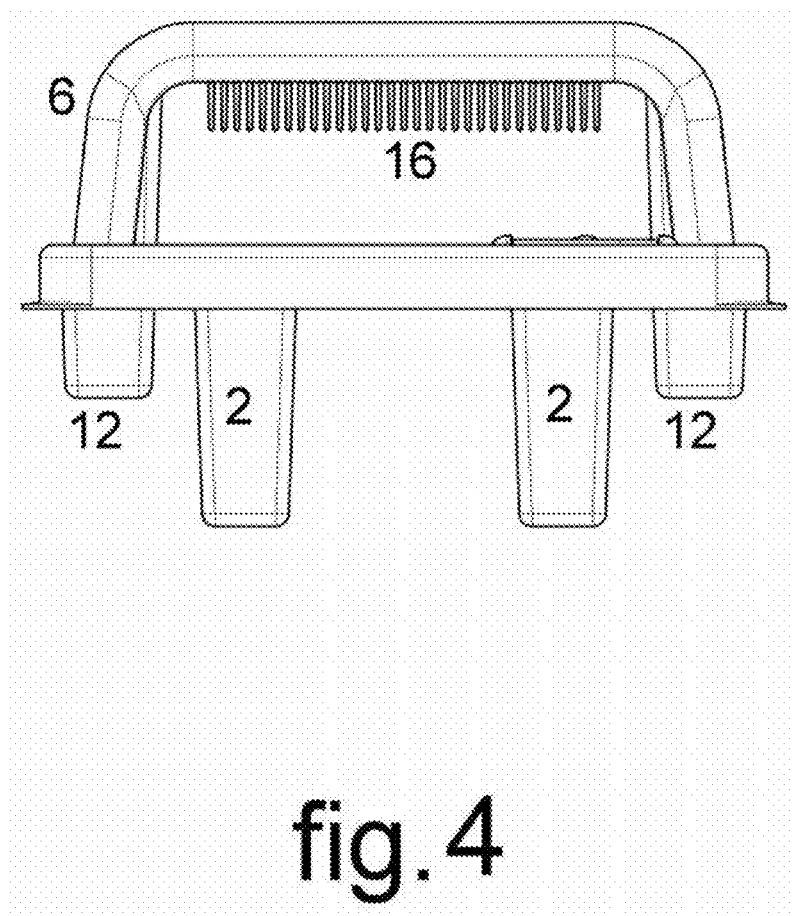
FIG. 4 shows an end view of the embodiment of the device shown in FIG. 1.
Figure 5:
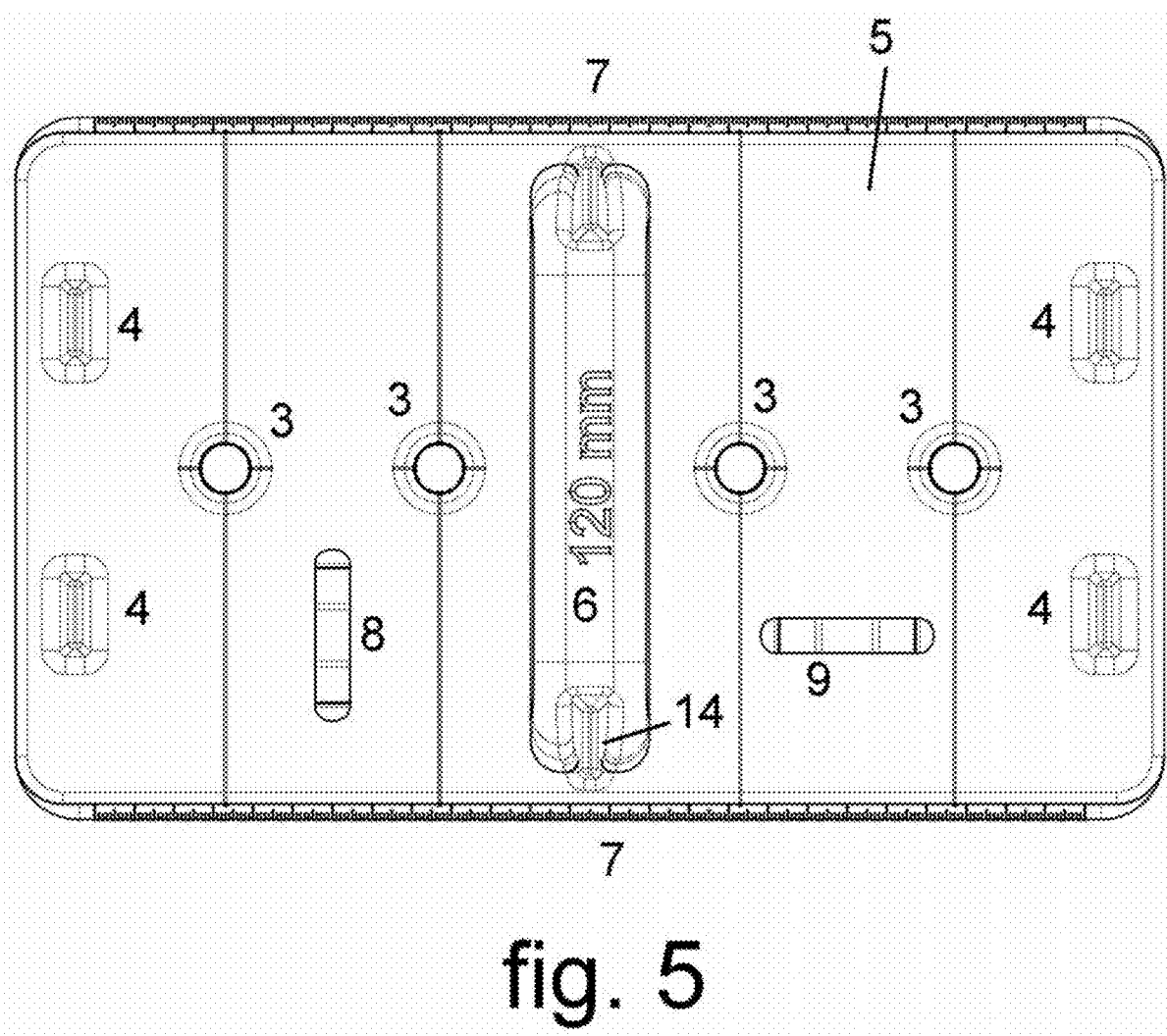
FIG. 5 shows a plan view from above of the embodiment shown in FIG. 1.
Figure 6:
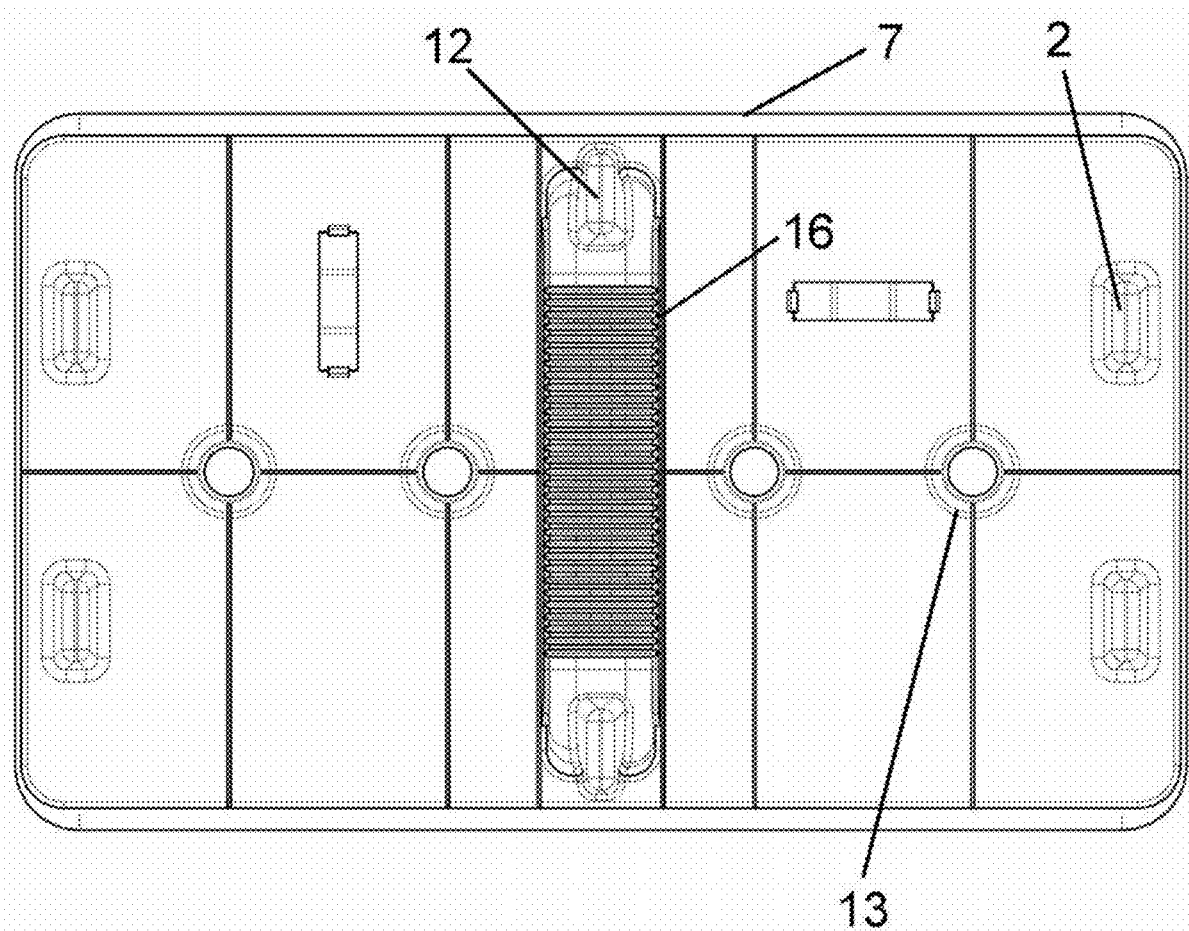
FIG. 6 shows a plan view from below of the embodiment shown in FIG. 1.
Figure 7:
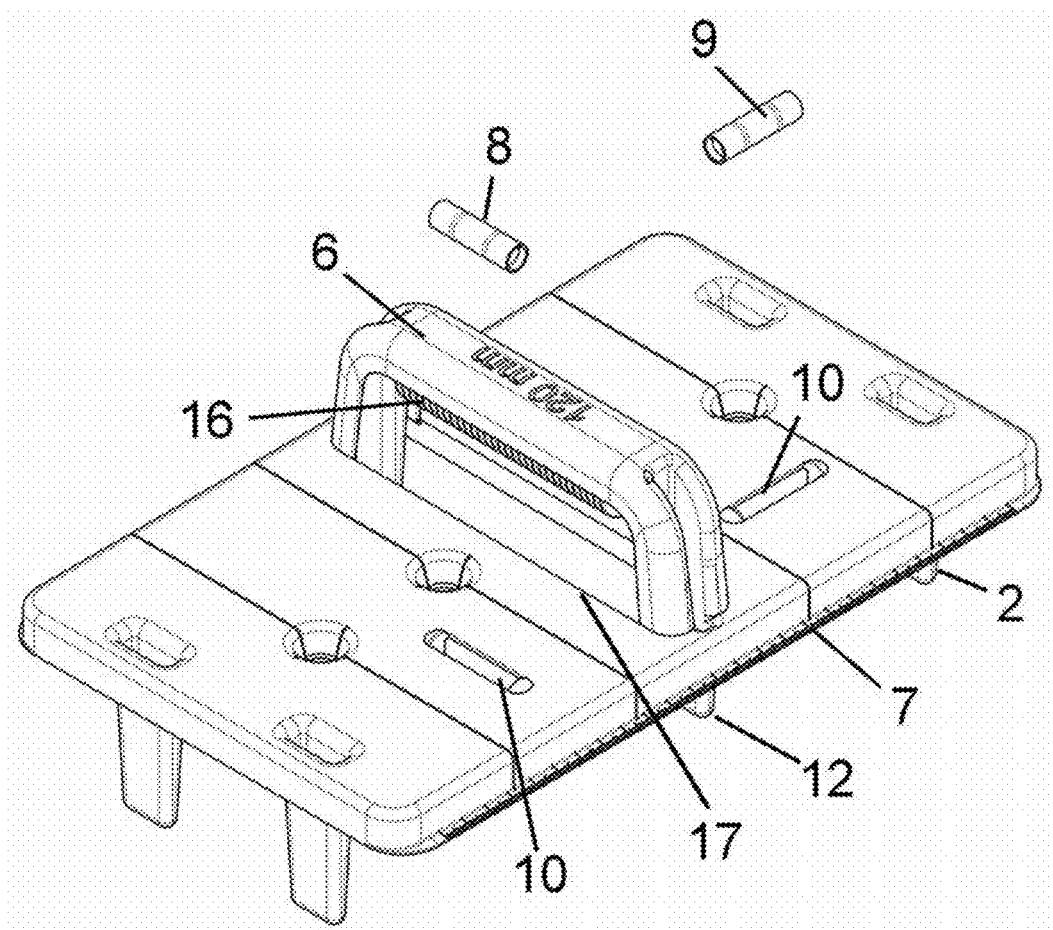
FIG. 7 shows an exploded isometric view of the embodiment shown in FIG. 1.

A rear face of the body is shown in FIG. 2. The rear face has ribs 11 to provide structural strength to the device. The screw holes 3 have a collar 13 defined on the rear face.

A pair of clips 10 are provided for receiving the levels 8.

Figure 8:
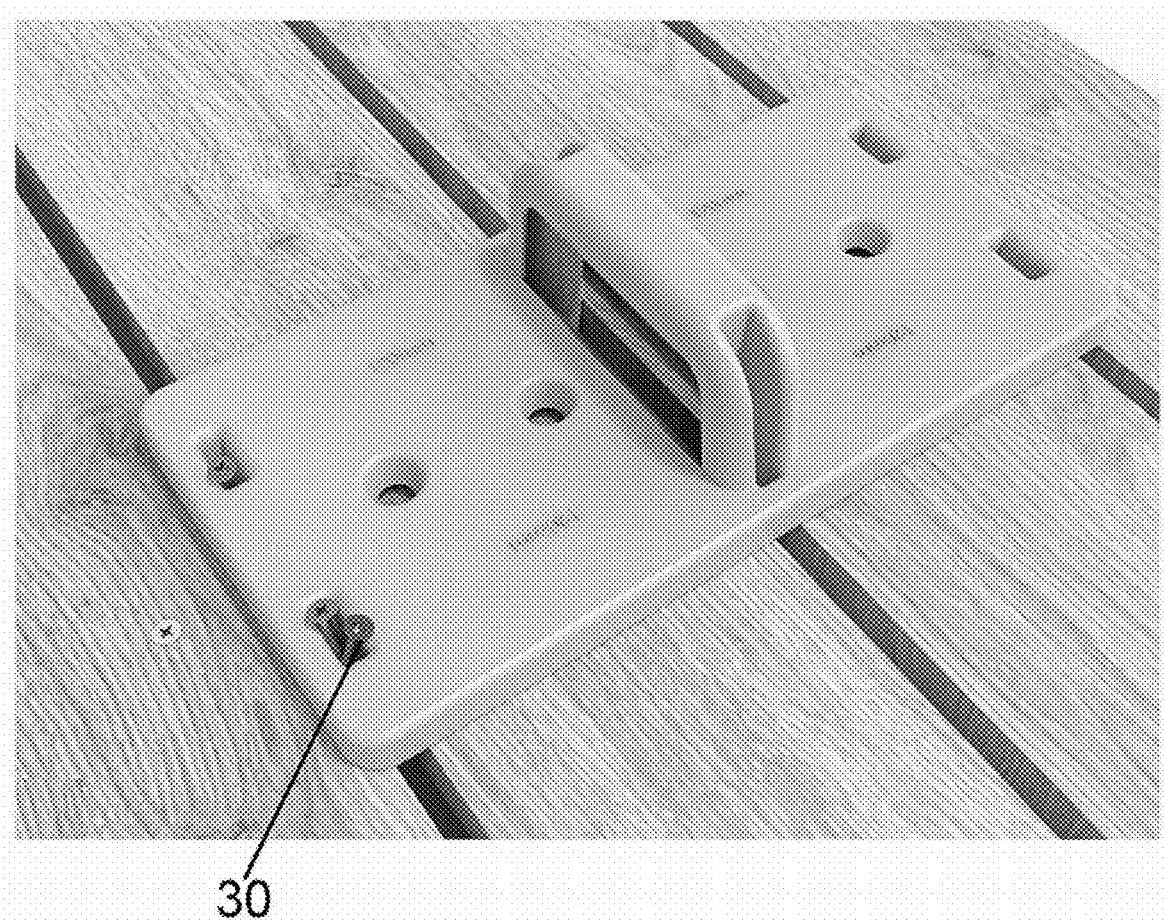
FIG. 8 shows an isometric view of a second embodiment of the device according to the present invention, in use.
Figures 9A, 9B:
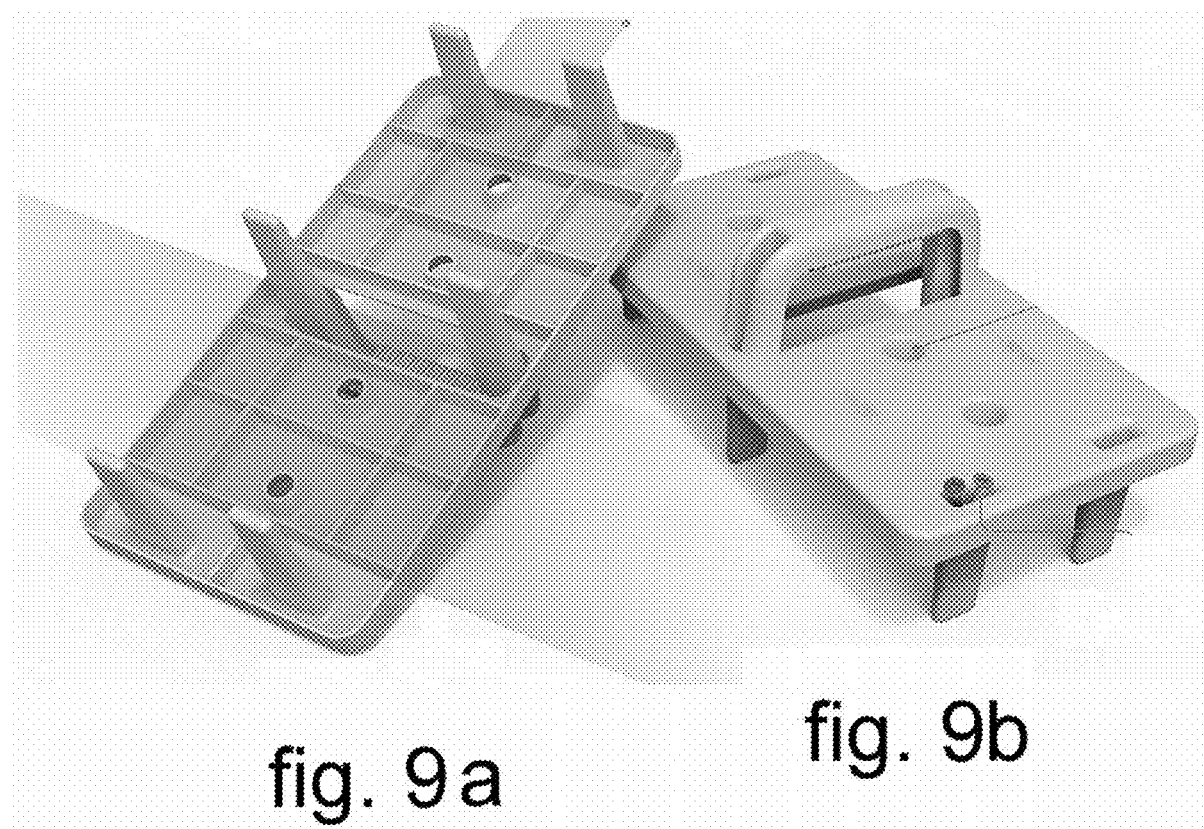
FIGS. 9a and 9b show isometric views of the embodiment shown in FIG. 8.

With reference to the embodiment shown in FIGS. 8 and 9b the hollows 30 of the spacers are used to store screws for later use through the screw hole or otherwise.

Figure 10:
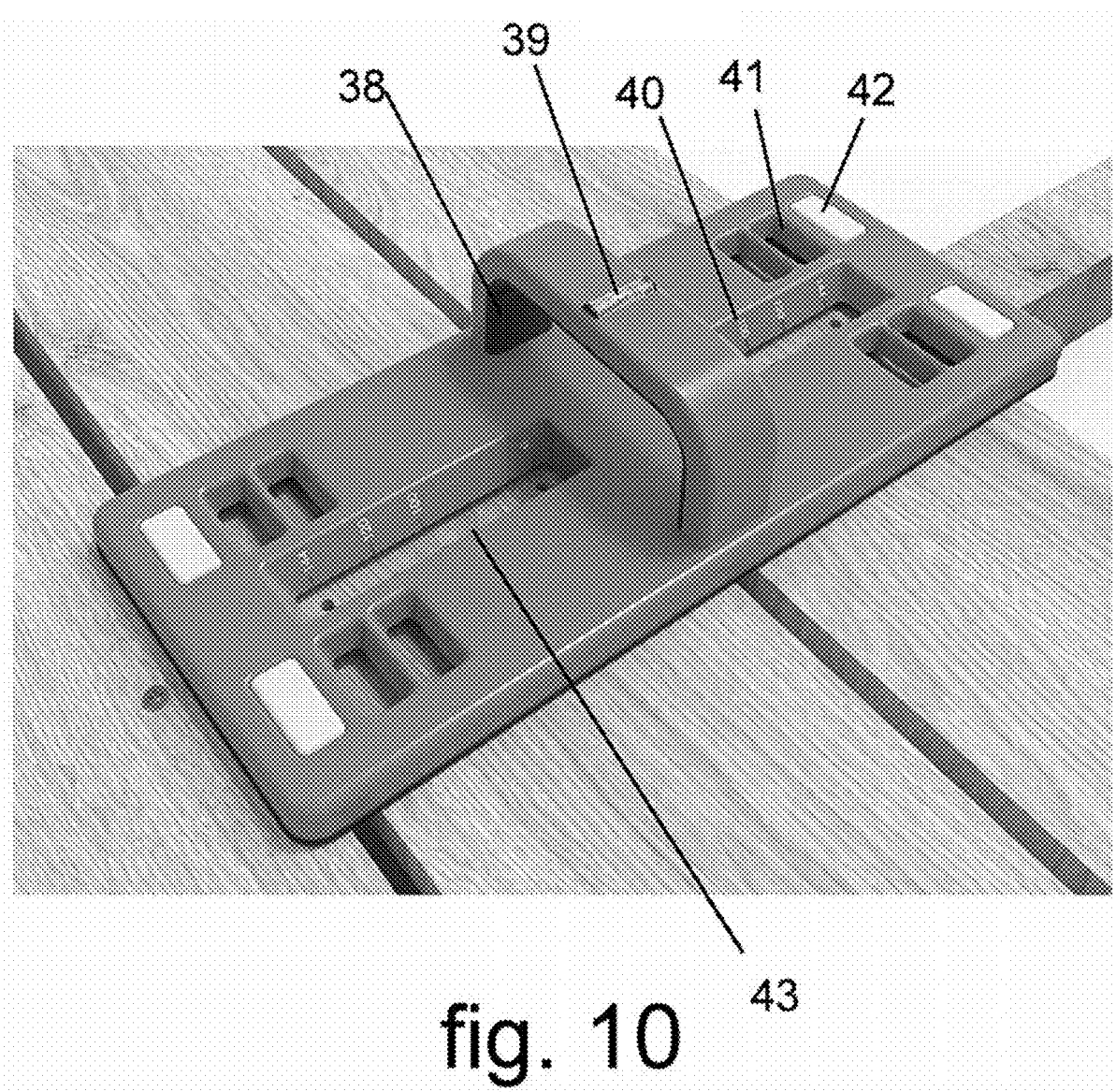
FIG. 10 shows an isometric view of a third embodiment of the device according to the present invention, in use.
Figure 11:
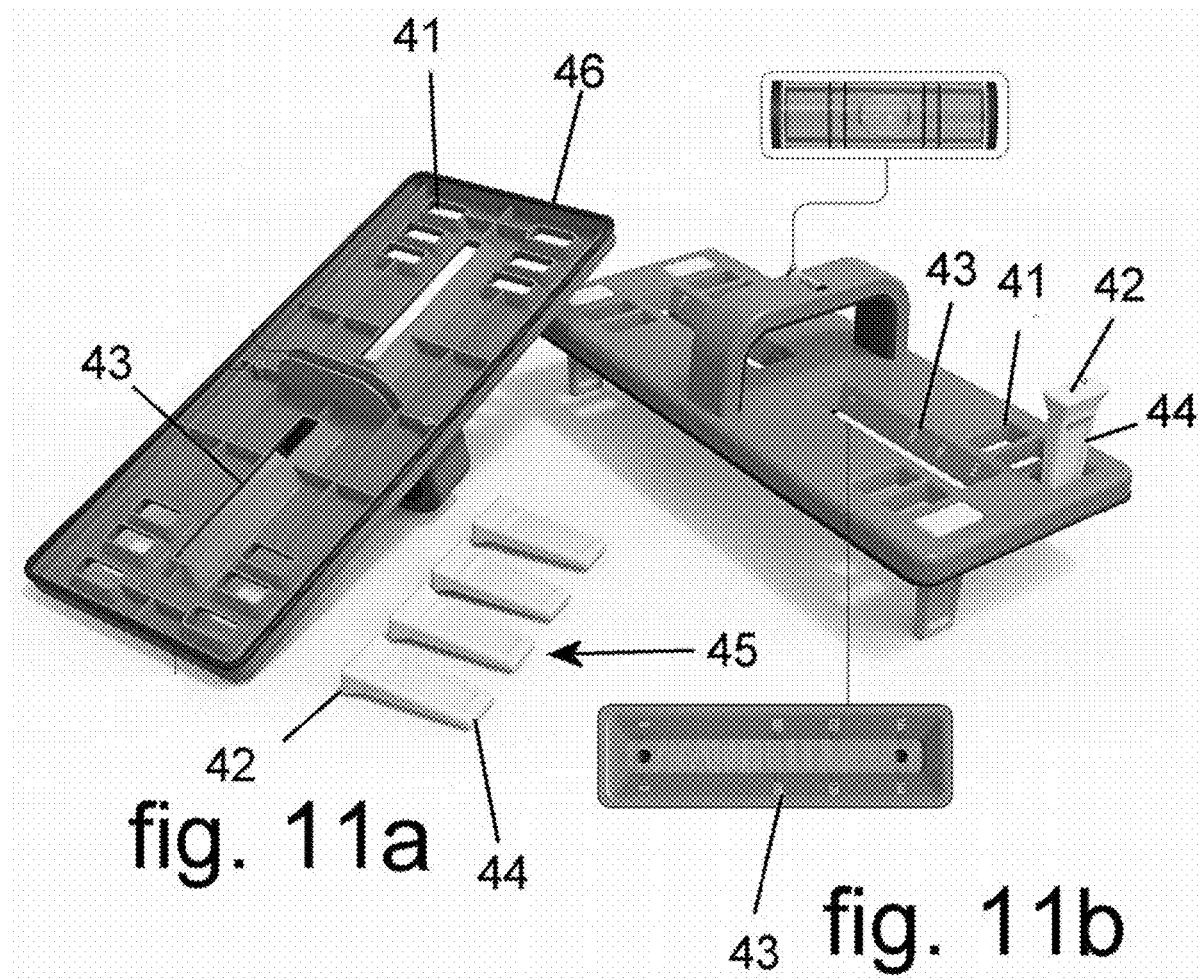
FIGS. 11a and 11b show exploded isometric views of the embodiment shown in FIG. 10.

With reference to the embodiment shown in FIG. 10 the handle 38 comprises an inset liquid level 39 centrally on a top surface. The handle 38 comprises an underside of resiliently deformable silicone covering.

The body has plural apertures 41 for receiving removable spacers 45. This arrangement enables removal and replacement of the spacers 45, according to preference of positioning and decking plank spacing. A central opening 43 is divided into two parts, to either side of the handle 38.

The central apertures 43 include a measurement guide 40 running along its peripheral sides, which are tapered inwards to aid in reading the measurements.

The spacers 45 have tapering sides 44 of a rectangular section, from a head 42 arranged to catch in the perforation 41.

Figure 12:
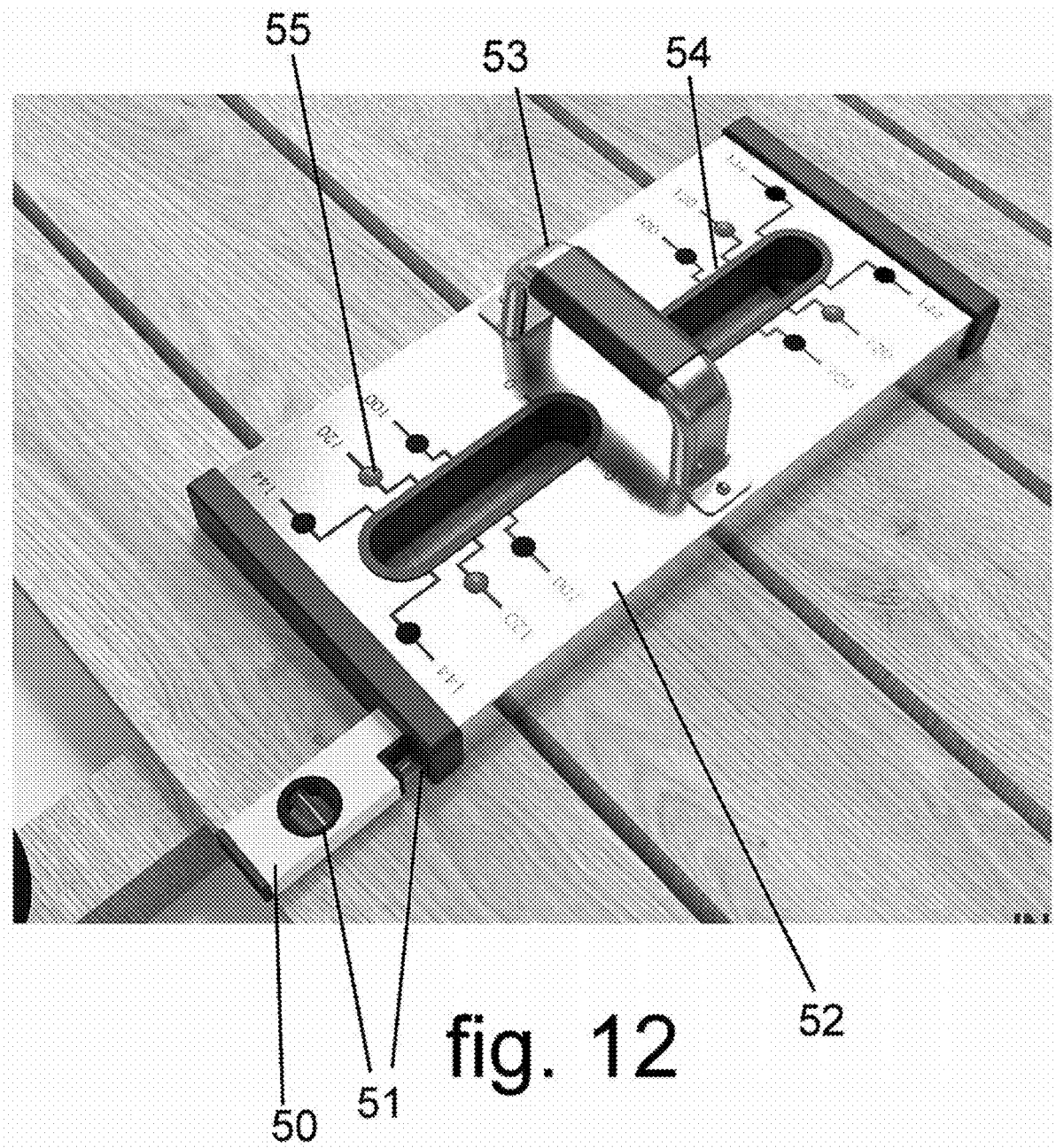
FIG. 12 shows an isometric view of a fourth embodiment of the device according to the present invention.

With reference to the embodiment shown in FIGS. 12 and 13b the body 52 is formed in a metal alloy or stainless steel, with a handle 53 permanently screwed thereon.

The body 52 further comprises thermoplastic spacers 56 running in channels 66 below the body 52. The spacers 56 have heads 60 with upwardly extending placement studs 55 on resiliently deformable tabs 59, arranged to bump-fit into and extend through plural apertures to signify spacing widths. The body 52 comprises thermoplastic end caps 61 so as to prevent the heads 60 exiting the channels 66. The apertures have markings 58 alongside.

The body comprises two longitudinal central openings 54 for visibility through the body 52.

The body further includes a hole in the end cap so as to enable insertion and removal of a ruler guide 50, with three inset bubble levels 51 in two orthogonal directions.

The invention has been described by way of examples only and it will be appreciated that variation may be made to the above-mentioned embodiments without departing from the scope of invention as defined by the claims, in particular but not solely combination of features of described embodiments.

The invention claimed is:

1. A deck construction device comprises:
   a body which has a handle and a substantially planar face from which at least one main blade and at least two removable second blades extend in use, and
   at least one screw hole is defined through the body and at least one aperture for receipt of the at least two removable second blades, wherein
   the at least one main blade is shorter lengthwise than the at least two removable second blades,
   the at least one main blade is arranged between opposed ends of the body and extends below the handle such that the at least one main blade and handle are aligned in a same plane, and
   the at least two removable second blades are arranged laterally on opposite sides of the at least one main blade, so that a space is defined between the at least one main blade and each of the at least two removable second blades, which defines regions into which a decking plank is received.

2. The deck construction device according to claim 1 wherein both the at least two removable second blades have a rectangular section along their length.

3. The deck construction device according to claim 1 wherein
   the at least two removable second blades are arranged so that when in use each of the at least two removable second blades is located either side of a decking plank against which the device rests;
   a location, an orientation and a width of the at least two removable second blades so are such as to space a first adjacent decking plank, located on one side of the decking plank, and a second adjacent decking plank, located on an opposed side of the decking plank, thereby spacing the first adjacent decking plank and the second adjacent decking plank apart one from another.

4. The deck construction device according to claim 1 wherein the at least one main blade and the at least two removable second blades are tapered.

5. The deck construction device according to claim 3 wherein the at least two removable second blades are arranged in sets comprising at least two of the at least two removable second blades arranged in a same plane which in use rest against a common side edge of the decking plank.

6. The deck construction device according to claim 1 wherein at least one of the at least two removable second blades is adjacent an end of the body.

7. The deck construction device according to claim 1 wherein at least one of the at least two removable second blades is arranged between two opposed ends of the body.

8. The deck construction device according to claim 1 wherein the at least one screw hole comprises at least two screw holes.

9. The deck construction device according to claim 8 wherein the at least two screw holes are arranged in an elongate track, running part or all of a length of the body.

10. The deck construction device according to claim 1 includes an aperture for receipt of the at least two removable second blades.

11. The deck construction device according to claim 1, further comprising a central opening arranged below the handle to permit stacking of devices atop one another.

12. The deck construction device according to claim 1, further comprising at least one liquid level.

13. The deck construction device according to claim 12, wherein the at least one liquid level comprises at least two levels arranged so that an axis of each of the at least two levels are orthogonal one to another.

14. The deck construction device according to claim 1, further comprising at least one guideline.

15. The deck construction device according to claim 1, further comprising a rule.

16. The deck construction device according to claim 1 wherein at least one of the at least two removable second blades is adjustable so as to vary its angle of orientation.

17. The deck construction device according to claim 16 wherein the at least two removable second blades are rotatable in the body.

\* \* \* \* \*